March 23, 1965  L. DUTHION ETAL  3,174,582
IN FLIGHT JET SILENCER

Filed Sept. 18, 1963  3 Sheets-Sheet 1

INVENTORS
Louis Duthion
Michel S.D. Hapenada
by Watson, Cole, Grindle & Watson
ATTORNEYS March 23, 1965    L. DUTHION ETAL    3,174,582
IN FLIGHT JET SILENCER Filed Sept. 18, 1963    3 Sheets-Sheet 3

INVENTORS
Louis Duthion
Michel S.D. Hafenscher
By Watson, Cole, Grindle & Watson
ATTORNEYS

United States Patent Office 3,174,582
Patented Mar. 23, 1965

3,174,582
IN FLIGHT JET SILENCER
Louis Duthion, Paris, and Michel S. D. Hafenscher, Neuilly-sur-Seine, France, assignors to Societe Bertin & Cie, Paris, France, a company of France
Filed Sept. 18, 1963, Ser. No. 309,661
Claims priority, application France, Sept. 26, 1962, 910,512
4 Claims. (Cl. 181—51)

This invention relates to muffler systems for reducing the noise accompanying the exhaust of gases from a jet craft engine or the like, and its main object is to provide an improved jet muffler attachment which will be especially useful in connection with jet propulsion engines operating with a high expansion ratio, such as are used for powering supersonic aircraft.

The continual increase in high-speed jet aircraft of ever-greater speed and power throughout the world raises an urgent problem in controlling the noise nuisance associated with the exhaust of jet gases from such craft. The usual method of dealing with this problem involves the provision of some sort of muffler system capable of converting the gas jet, of generally circular cross section, escaping from the exhaust nozzle of the aircraft propulsion plant into a plurality of flat or otherwise-shaped jets of relatively small cross sectional area each capable of mingling intimately with external air, whereby the exhaust noise is substantially reduced in intensity. Conventional jet mufflers of this type are generally provided as fixed baffle structures at the outlet of the exhaust nozzle of the jet engine.

Since any form of exhaust muffler necessarily introduces a drop in engine efficiency, it is desirable to disable the operation thereof under conditions where the noise factor is of minor importance as during cruising flight of a supersonic aircraft at high altitude.

It is accordingly an object of this invention to provide an improved exhaust muffler for jet engine use, provided with means for easily rendering it operative or inoperative during flight.

Another object is to provide an improved dual-purpose attachment for high-speed jet aircraft, capable of being easily and quickly set during flight to either one of two operating conditions, in one of which the attachment acts as a muffler for dividing the exhaust jet into a plurality of relatively thin streams of gas and mixing these with air to reduce noise, while in the other condition of the attachment muffler operation is suspended and the attachment instead provides a venturi conduit through which the exhaust jet issues to atmosphere thereby to increase the propulsive thrust applied to the aircraft.

A further object is to provide an improved jet muffler device having provision for drawing in additional atmospheric air and mixing the same with the thin gas streams into which the exhaust jet is divided thereby to enhance the efficiency of the silencing process.

The above and further objects of the invention as well as the novel features serving to accomplish such objects will be apparent from the ensuing description of one embodiment of the invention selected by way of illustration but not of limitation and illustrated in the accompanying drawings wherein:

FIGURES 4 and 5 are views respectively similar to FIGURES 1 and 2 but illustrating a minor modification in respect to the actuator arrangement used.

Figure 1:
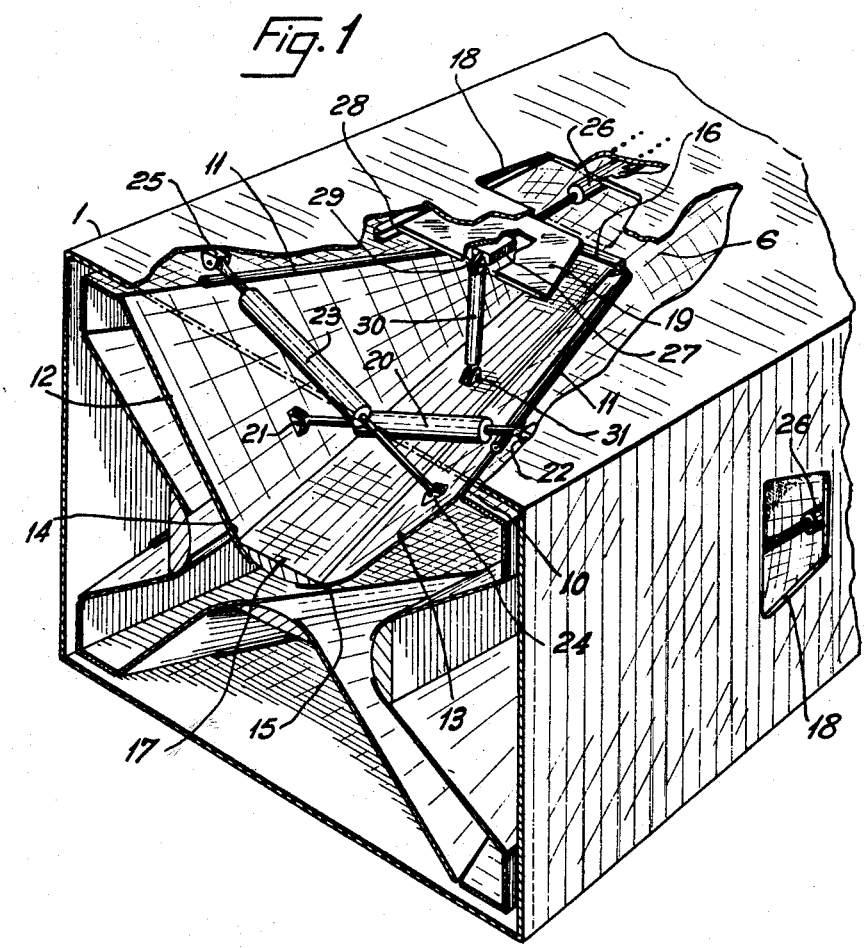
FIGURE 1 is a view in simplified perspective of an attachment according to the invention, set to its "silencing" condition of operation, with the left end being shown in section on the line I—I of FIGURE 2.
Figure 2:
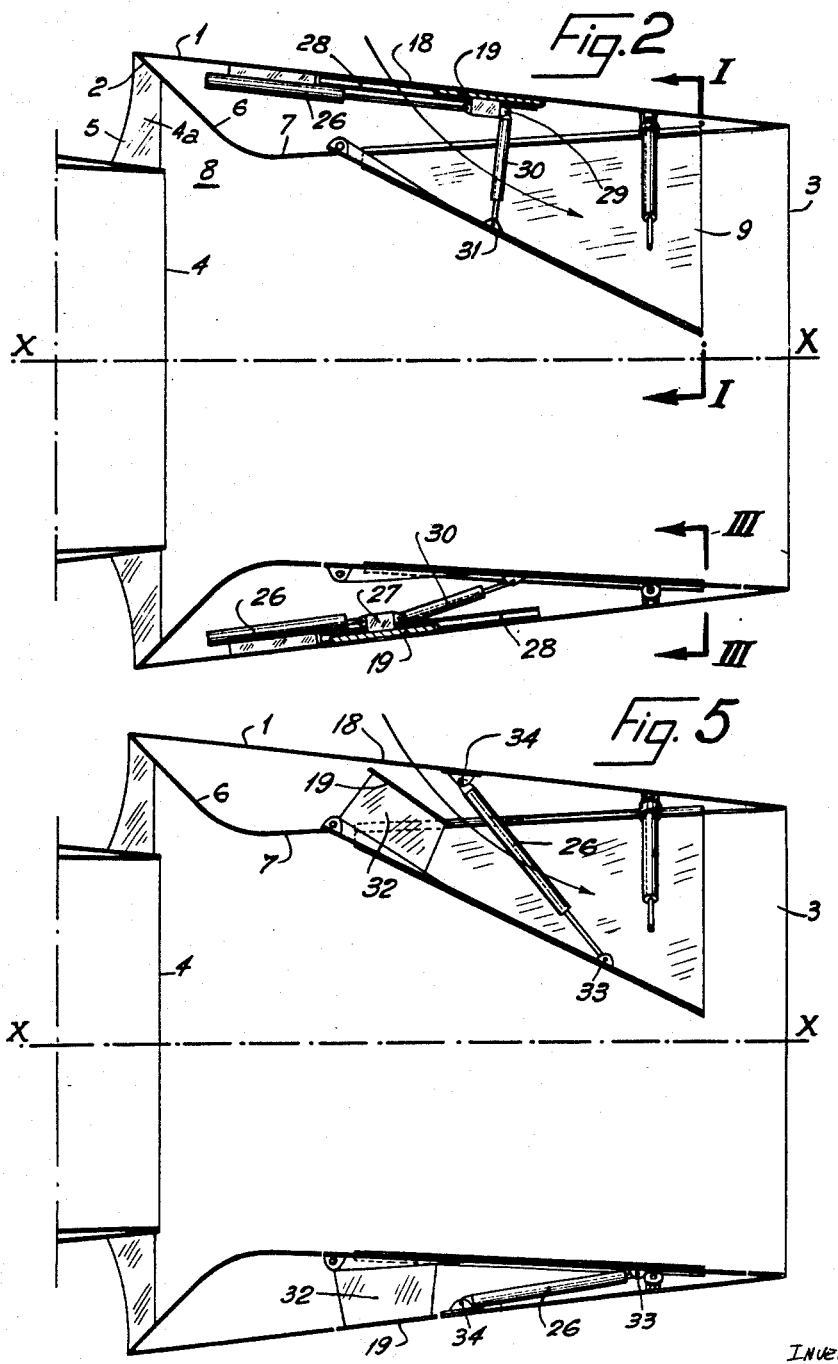
FIGURE 2 is a longitudinal sectional view of the attachment with the upper part, above center line X—X, being shown in the "silencing" setting and the lower part below line X—X shown in "venturi" or "cruising" setting.
Figure 3:
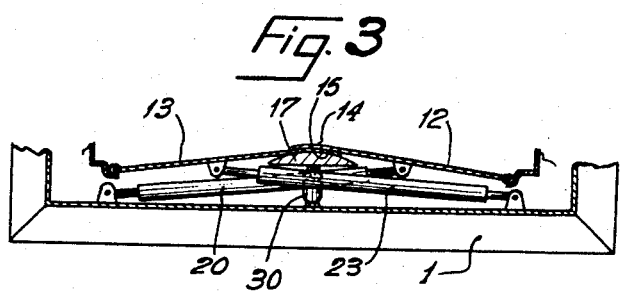
FIGURE 3 is a partial transverse setional view on line III—III of FIGURE 2.

Referring primarily to the construction shown in FIGURES 1–3, the attachment of the invention comprises an outer casing 1 of generally rectangular cross section gradually diminishing in size from its intake end 2 to its outlet end 3, as shown especially clearly in FIGURE 2. The casing 1, in use, is mounted coaxially with the exhaust pipe or jet nozzle 4 of an aircraft jet propulsion unit, not shown, being supported from the rear end of said exhaust pipe 4 by way of radial spider arms 4a, with the rear end of pipe 4 preferably projecting a small amount into the casing 1 as shown. Between the outer periphery of exhaust pipe 4 and the inner periphery of casing 1 there is defined an annular air intake aperture 5.

Metal sheeting generally designated 6 supported within the casing 1 is generally conformed to provide a venturi nozzle structure coaxial with the common axis X—X of exhaust pipe 4 and casing 1, and including in the well-known manner a converging intake section 8, a restricted neck section 7, and a diverging outlet section 9. The inlet and outlet ends of the venturi structure 6 connect with and correspond in cross sectional shape with, the corresponding ends 2 and 3 of the rectangular casing 1. Intermediate its ends, and especially at the neck section 7, the venturi may have any desired cross sectional contour preferably corresponding with that of the exhaust pipe 4. Thus if the exhaust nozzle 4 is circular, the neck section 7 may also be circular in cross sectional shape, while if the nozzle 4 is rectangular, then the neck section 7 of the venturi would be of corresponding rectangular shape.

The relatively long, outwardly tapering wall of the diverging outlet portion of the venturi conduit structure 6 has four wide cutouts 10 formed in it each facing a corresponding one of the four sides of the rectangular casing 1. The four cutouts 10 are each of generally trapezoidal form, as best seen in FIGURE 1, with their larger bases extending in a transverse direction near the outlet end 3 of the system, their smaller bases extending transversely near the neck section 7, and their oblique sides extending at symmetrical angles between said larger and smaller bases, and extending substantially on planes containing the center line X—X. With each trapezoidal cutout 10 is associated a set of three flaps hinged along three respective sides of the cutout. Specifically, there are provided in each cutout 10 a pair of side flaps 12 and 13 hinged to the symmetrical oblique sides of the cutout through suitable hinge means 11, each of said side flaps being trapezoidal in shape and substantially wider than one half the width of the cutout 10 and slightly longer than the length of the cutout; there is further provided a third flap 17 hinged to the inner, or smaller, base side of the cutout 10 by way of a hinge 16, and shaped as a narrow elongated trapezoid having its larger base positioned near the outlet end and corresponding substantially in length to that of the side flaps 12 and 13. As will be noted from FIGURES 1 and 3, the free longitudinal edges of the side flaps 12 and 13 are arcuate as at 14, 15 respectively, with the concavity of the arcuate portions being directed outwards towards the related cutout 10. Also the inner surface of central flap 17, i.e. the surface thereof directed away from the related cutout 10, is rounded as shown so as to fit snugly with the concave outer surfaces 14 and 15 of the side flaps. The relative dimensioning of the three flaps associated with each cutout and the over-all geometry are such that with the three flaps rotated a maximum amount inwardly around their respective hinges, as shown in FIGURE 1 and the upper part of FIGURE 2, the three flaps of each set cooperate in sealing relationship to provide a continuous inwardly-projecting formation of trapezoidal cross sectional shape and the four formations in turn cooperate to define a cruciform or X-shaped restricted passageway between them, which passageway connects at its inlet end with the outlet of exhaust pipe 4 and annular air intake 5, and connects at its outlet end with the outlet end 3 of casing 1.

In each of the four walls of rectangular casing 1 there is provided a relatively small cutout or opening 18, positioned adjacent to the inlet end portion of the related diverging wall of the venturi 6, and preferably shaped as a trapezoid with its larger base directed toward the outlet end of the system. With each aperture 18 is associated a cover plate 19 of corresponding shape but larger area and slidable as presently described between a position in which it clears and a position in which it seals said opening 18.

Associated with the three flaps 12, 13, 17 of each set is a respective set of three fluid actuators 20, 23, 26, simultaneously operable to displace all four sets of flaps either to the "silencing" position earlier referred to and shown in FIGURE 1 and in the upper part of FIGURE 2, wherein all the flaps are tilted inward about their hinges to define the afore-mentioned X-shaped passageway, or to the "venturi" position in which the flaps lie substantially flat along the sides of the diverging wall portions of the venturi 6, as shown in the lower part of FIGURE 2 and in FIGURE 3. As shown. actuator 20 has one end pivoted at 21 to a point of side flap 12 and its opposite end pivoted at 22 to a point of casing 1; actuator 23 has one end pivoted at 24 to side flap 13 and its opposite end pivoted at 25 to casing 1. Actuator 26 is arranged, at the same time as it displaces the middle flap 17, to displace the cover plate 19 between its clear and sealing positions. For this purpose actuator 26 has its cylinder secured to the inner surface of casing 1 longitudinally across the opening 18, and its piston rod engages a block 27 secured to the under surface of plate 19, the side edges of which plate are guided in longitudinal ways 28 of casing 1. A link 30 has its ends pivoted respectively at 29 to block 27 and at 31 to a point of flap 17.

The general arrangement is such that with the four sets of actuators such as 20, 23, 26 all retracted, the four sets of flaps are applied outwardly around their hinges to lie substantially flat against the diverging wall of venturi 6 (the "cruising" position shown in the under part of FIGURE 2 and in FIGURE 3), and the cover plates 19 are sealing the related apertures 18, while with all actuators expanded, the flaps are inclined inward to provide the silencing condition shown in FIGURE 1 and upper part of FIGURE 2, and the cover plates 19 are clearing the openings 18.

Figure 4:
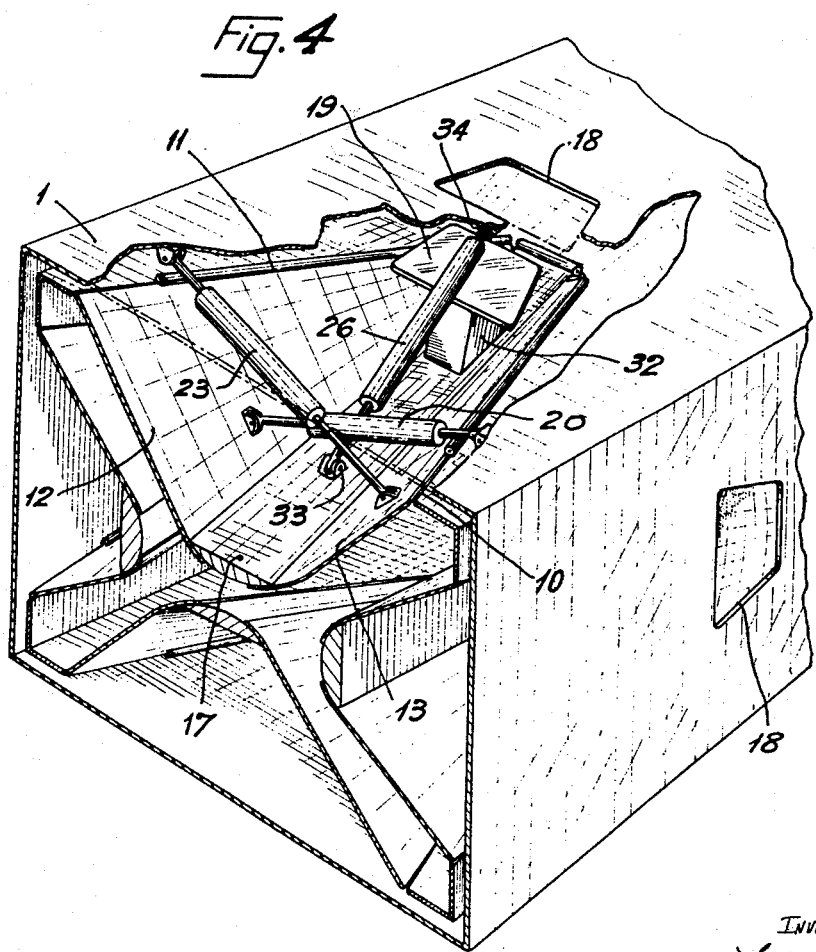

The modified construction shown in FIGURES 4 and 5 differs from that just described only in the arrangement of the actuator means for displacing the center flaps 17 and cover plates 19. In this case, the plates 19 are rigidly secured to the related center flaps 17 by way of brackets 32. The actuator 26 is pivoted at one end at 33 to flap 17 and at its other end at 34 to casing 1. The movement of cover plate 19 between its clearing and sealing positions is a movement of rotation rather than planar displacement. Otherwise, the two constructions are identical and no further description of the modification of FIGURES 4 and 5 is believed necessary.

The operation of the system described will be easily understood from the explanations given above. When muffler operation is not desired, as when the aircraft is cruising at high altitude, the four sets of actuators 20, 23, 26 are simultaneously retracted by conventional means not shown, which may be manually or automatically controlled. This action applies all the flaps such as 12, 13, 17 outwards around their respective hinges into close mutual engagement in a position sealing the respective cutouts 10, as shown in FIGURE 3 and in the lower part of FIGURE 2. It will be noted that flaps 12 and 13 are then positioned with their rounded edges 14 and 15 in overlap, middle flap 17 is positioned between the edge 14 of flap 12, 13 and casing 1; cover plates 19 are sealing the respective air intake openings 18. In this condition, the attachment of the invention is fully equivalent to a conventional venturi booster provided at the outlet of the jet pipe, offering no impedance whatever to the escape of the jet gases from exhaust pipe 4 mixed with air drawn in through annular intake 5, but instead increasing the exhaust velocity thereof over what would be had in the absence of the attachment, and correspondingly increasing the propulsive thrust applied to the aircraft.

When it is desired to provide muffler operation, the actuators are simultaneously expanded. The three flaps in each of the four sets are all rotated inwards to the position shown in FIGURE 1 (or 4) and the top of FIGURE 2 (or 5) uncovering the wide cutouts 10. At the same time the four plates 19 are moved to uncover the additional air inlet openings 18. In this position of the parts the jet of exhaust gases issuing from exhaust pipe 4, mixed with primary air from annular intake 5, is now constrained to flow through the restricted X-shaped passageway defined interiorly of the four sets of flaps, and is thereby contracted into four flat, broad, sheets or veins having considerably increased surface area over the initial compact jet of circular (or other) cross section. At the same time large amounts of secondary air are drawn in through the oblique air passages defined by the openings 18 and 10 by the suction created by the gas flow, and said secondary air mixes with the exhaust jet at the outlet end of the X-shaped passageway somewhat upstream of the outlet end of the casing 1. This mingling of the exhaust gases and air occurs with very great efficiency owing to the large surface contact area of the flat sheets of gas as just noted. Efficient noise muffling is thus obtained. It will be noted that in the illustrated embodiment, the cutouts 10 and hence also the flaps 12, 13, 17 associated therewith are terminated somewhat short of the rear end of the venturi structure 6 and casing 1. This is advantageous in that it facilitates the entrainment of secondary air from the air intake passages such as 18–10 by the gas flow thereby improving the efficiency of the gas/air mixing step and of the silencing process, as well as facilitating construction. However, it would lie within the scope of the invention to extend the cutouts 10 and the flaps 12, 13, 17 as far as the rear end of the venturi and/or the casing structures if so desired.

Various other modifications may be made in the exemplary embodiment illustrated and described without exceeding the scope of the invention. Thus the number of cutouts such as 10 and associated sets of flaps and actuators, herein four in number so as to provide a cruciform or X-shaped passageway for the exhaust jet in the "muffler" setting of the system, may be made greater or less than four. The actuator devices, shown as being controlled by fluid pressure, may be electrical or mechanical in character. The primary air inlet formed by the annular intake aperture 5 may be in some cases be omitted. Only two flaps, rather than the three shown, may be associated with each cutout 10. Yet other departures from the construction shown may be resorted to.

What we claim is:

1. A jet muffler system comprising structure attachable rearwardly of an exhaust pipe to be muffled and defining a venturi-shaped conduit for the flow of a jet of exhaust gases from said pipe to atmosphere including a converging inlet section surrounding said pipe in radially spaced relation therewith and followed by a diverging section, apertures in the diverging section of the conduit to provide air intakes thereinto, flaps pivotally connected to said structure adjacent said apertures and rotatable between an inner position in which said flaps cooperate to define a constricted passageway for said jet within the conduit and said apertures are open to mix intaken air with said jet and muffle exhaust noise, and an outer position wherein the flaps are retracted to clear the venturi conduit and seal said apertures for boosting the velocity of the exhaust gases, and actuator means for selectively rotating the flaps between said inner and outer positions, said flaps comprising a set of at least two flaps associated with each aperture and rotatable about generally longitudinal axes, said flaps of each set cooperating in said inner position thereof to define a continuous convex surface projecting inwardly of said conduit and all said surfaces cooperating to define said constricted passageway.

2. A jet muffler system comprising structure attachable rearwardly of an exhaust pipe to be muffled and defining a venturi-shaped conduit for the flow of a jet of exhaust gases from said pipe to atmosphere including a converging inlet section surrounding said pipe in radially spaced relation therewith and followed by a diverging section, apertures in the diverging section of the conduit to provide air intakes thereinto, flaps pivotally connected to said structure adjacent said apertures and rotatable between an inner position in which said flaps cooperate to define a constricted passageway for said jet within the conduit and said apertures are open to mix intaken air with said jet and muffle exhaust noise, and an outer position wherein the flaps are retracted to clear the venturi conduit and seal said apertures for boosting the velocity of the exhaust gases, and actuator means for selectively rotating the flaps between said inner and outer positions, said flaps comprising a set of three flaps associated with each aperture, two of said flaps rotatable about generally longitudinal axes and a third flap rotatable about a transverse axis, the flaps in each set cooperating in said inner position thereof to define a continuous convex surface of trapezoidal cross section projecting inwardly of said conduit and all said surfaces cooperating to define said constricted passageway.

3. The muffler system claimed in claim 1, wherein there are four apertures and four associated sets of flaps associated with said structure in regularly distributed relation therearound and cooperating in said inner position thereof to define a generally X-shaped constricted passageway.

4. The muffler system claimed in claim 2, wherein said first two flaps each have their free longitudinal edge portions arcuate and said third flap has a correspondingly arcuate contour for tight mating engagement of all three flaps in each set in at least said inner positions thereof.

References Cited by the Examiner

UNITED STATES PATENTS

| | | |
|---|---|---|
| 2,546,293 | 3/51 | Berliner. |
| 2,593,420 | 4/52 | Diehl _____ 60—35.6 |
| 2,995,010 | 8/61 | Arscott _____ 60—35.6 |
| 3,027,714 | 4/62 | Parker. |
| 3,038,304 | 6/62 | Alford _____ 60—35.6 |
| 3,044,258 | 7/62 | Carlton et al. _____ 60—35.6 |
| 3,062,003 | 11/62 | Hamilton _____ 60—35.6 |

FOREIGN PATENTS

| | | |
|---|---|---|
| 1,215,237 | 11/59 | France. |
| 874,496 | 8/61 | Great Britain. |

LEO SMILOW, *Primary Examiner.*